Patented July 4, 1950

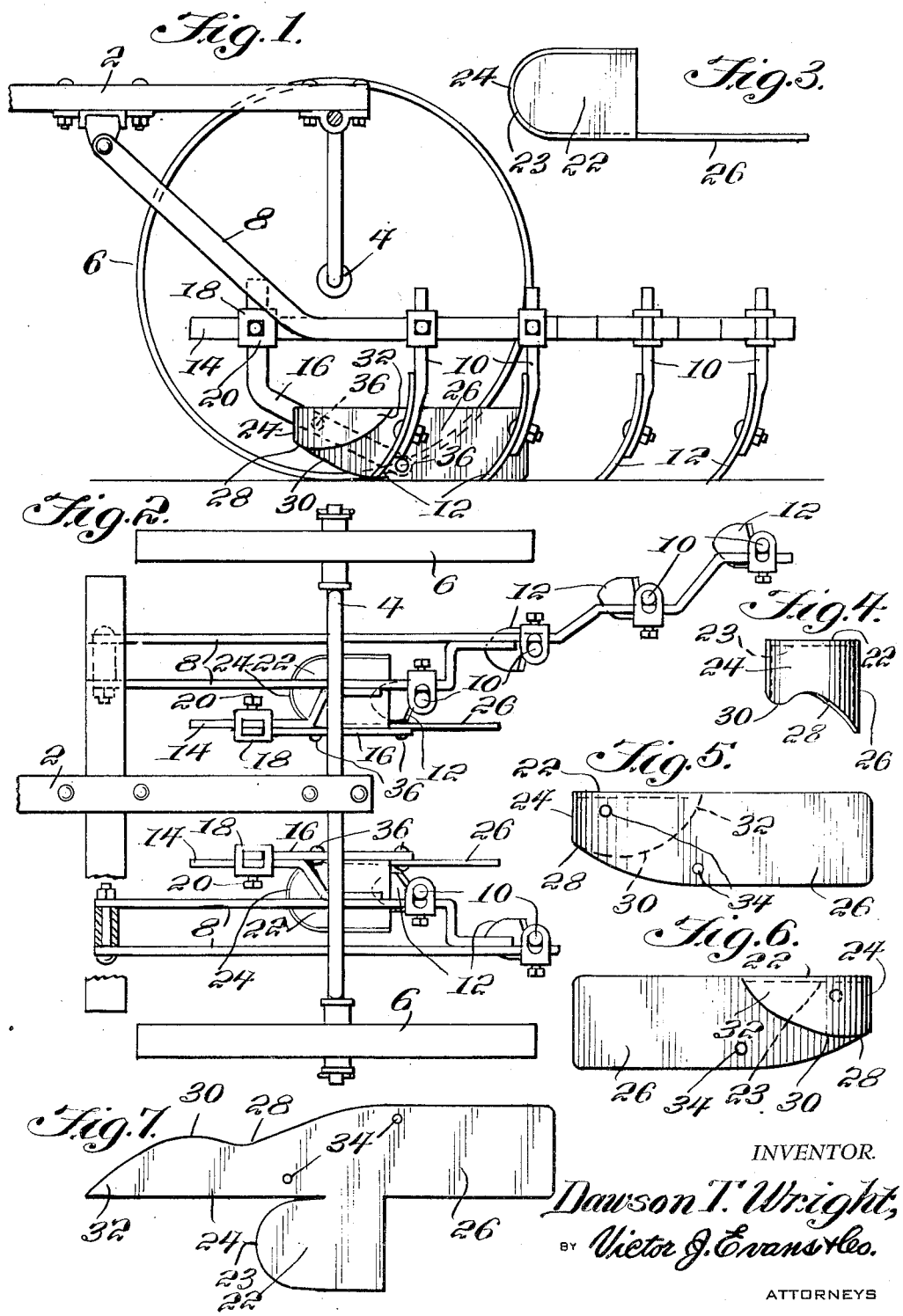

2,513,543

UNITED STATES PATENT OFFICE 2,513,543

CULTIVATOR SHIELD

Dawson Taylor Wright, Kansas City, Mo.

Application July 17, 1946, Serial No. 684,201

2 Claims. (Cl. 97—188)

My present invention relates to an improved cultivator shield of the type employed with earth cultivators to prevent the cultivator shovels in their passage through the earth from casting clods or lumps upon the rows of crops such as corn which during their early and tender stages require cultivation but which suffer damage when subjected to the continual pressure of rolled or thrown clods of earth.

In the accompanying drawings I have illustrated one complete example of the physical embodiment of my invention according to the best mode I have thus far devised but it will be understood that various changes and alterations may be made in the exemplified structure within the scope of the appended claims.

In the drawings:

Figure 1 is a side elevational view of a cultivator embodying the shield of my invention.

Figure 2 is a top plan view thereof.

Figure 3 is a top plan view of the shield.

Figure 4 is a rear elevational view of the shield.

Figure 5 is a side elevational view of the shield as adapted for use on the right hand shovels.

Figure 6 is a side elevational view of the same as adapted for use on the left hand shovels.

Figure 7 is a top plan view of the unshaped blank.

Referring now to the drawings wherein like characters indicate like parts, I have illustrated a cultivator frame 2 having an axle 4 carrying wheels 6. The cultivator bars 8 depend from the frame and the cultivator shanks 10 secure the shovels 12 in adjusted position to pass under the surface of the earth and between the rows to be cultivated.

An extension 14 on the inner bars 8 carries the angular rods 16 by means of the adjusting collars 18 and the screws 20.

The shield or fender of my invention consists in a preferably sheet metal blank as seen in Figure 7 bent to form the shield of my invention. The blank is fashioned with a top 22 with a curved forward edge 23 to conform to the curved front of the shield 24. The side wall 26 is elongated and converges toward the front in an inward curve 28 (upward when formed) and an outward curve 30 (downward when formed) and the side then tapers to a point at 32.

Holes 34 in the side wall 26 receive the bolts 36 for attachment to the bar extensions 14.

The blank is formed into the fender or shield of my invention by bending the top portion 22 along its lateral connection with the side portion, and the forward tapering portion of the side wall is curved around the rounded portion 23 of the top and is suitably joined to the periphery of the top as by welding.

As shown in the assembled views the side wall prevents the side movement of lumps or clods from the inner shovels and the inner or upward curve 28 forms a passage for uneven portions or irregularities in the surface being cultivated.

In operation, the two inner shovels straddle the row under cultivation and the fenders being located inside the inner shovels prevent earth from being cast upon the growing crops such as corn. Then only the side edge of the shield touches the earth and this edge has no perceptible effect thereon. Stones or hard clods will pass through the passage forward of the fenders and will not damage or dent the shield.

It will be apparent that the shield of my invention is simple to manufacture and install on existing equipment and it has proved efficient and beneficial in operation in preventing the barrage of clods and stones to which the rows being cultivated are normally subjected.

Having thus fully described my invention what I claim as new and desire to secure by Letters Patent is:

1. A cultivator shield comprising an inverted channel-shaped member having a horizontally disposed upper surface with depending outer and inner side walls, said upper surface having a semi-circular forward end with a vertically disposed skirt depending therefrom, the outer side wall being substantially rectangular-shaped with an arcuate lower edge at the forward end and the outer side wall extending a considerable distance beyond the rear edge of the said upper surface, and said inner side wall being substantially triangular-shaped with the forward end merging with the said depending skirt of the forward end of the shield.

2. A cultivator shield comprising an inverted channel-shaped member having a horizontally disposed upper surface with depending outer and inner side walls, said upper surface having a semi-circular forward end with a vertically disposed skirt depending therefrom and with an upwardly positioned recess in the central portion of the lower edge of said skirt, the outer side wall being substantially rectangular-shaped with an arcuate lower edge at the forward end merging with the lower edge of the skirt at the front and the outer side wall extending a considerable distance beyond the rear edge of the upper surface, said outer side wall having bolt holes therein, and said inner side wall being substantially triangular-shaped with the vertex thereof positioned at the rear edge of the upper surface and with the gradually increasing heighth thereof merging with the skirt at the front of the shield.

DAWSON TAYLOR WRIGHT.

REFERENCES CITED

The following references are of record in the file of this patent:

UNITED STATES PATENTS

| Number | Name | Date |
|---|---|---|
| 1,090,025 | Cash | Mar. 10, 1914 |
| 1,256,473 | Goodman | Feb. 12, 1918 |
| 1,495,113 | Schneider | May 20, 1924 |